Sept. 23, 1969   J. W. RABEK   3,468,175
TRANSMISSION
Filed Aug. 15, 1967   6 Sheets-Sheet 1

INVENTOR.
JAN W. RABEK
BY
Fraser & Bogucki
ATTORNEYS

Sept. 23, 1969     J. W. RABEK     3,468,175

TRANSMISSION

Filed Aug. 15, 1967     6 Sheets-Sheet 2

INVENTOR.
JAN W. RABEK

BY
Fraser & Bogucki
ATTORNEYS

Sept. 23, 1969 J. W. RABEK 3,468,175
TRANSMISSION

Filed Aug. 15, 1967 6 Sheets-Sheet 3

INVENTOR.
JAN W. RABEK

Fraser & Bogucki
ATTORNEYS

INVENTOR.
JAN W. RABEK

BY

Fraser & Bogucki

ATTORNEYS

Sept. 23, 1969　　　　　　　　　　J. W. RABEK　　　　　　　　　3,468,175
TRANSMISSION

Filed Aug. 15, 1967　　　　　　　　　　　　　　　　　　　6 Sheets-Sheet 5

FIG.-20

INVENTOR.
JAN W. RABEK

BY
Fraser & Boguski
ATTORNEYS

Sept. 23, 1969    J. W. RABEK    3,468,175
TRANSMISSION
Filed Aug. 15, 1967    6 Sheets-Sheet 6

INVENTOR.
JAN W. RABEK
BY
Fraser & Bogucki
ATTORNEYS

United States Patent Office 3,468,175
Patented Sept. 23, 1969

3,468,175
TRANSMISSION
Jan W. Rabek, 2150 Patricia Ave.,
Los Angeles, Calif. 90025
Filed Aug. 15, 1967, Ser. No. 660,814
Int. Cl. F16h 21/12, 25/18
U.S. Cl. 74—63     11 Claims

ABSTRACT OF THE DISCLOSURE

A transmission is disclosed which includes a pair of wave gears coupled together by a carrier-supported, harmonic motion oscillator means traversing the undulating surfaces of the wave gears. Either one of the wave gears or the oscillator means carrier may function as the input driving element, the output being derived from one or both of the remaining elements, the velocity ratio obtained being determined by the ratio of the number of waves on one gear to the number of waves on the other gear.

Background of the invention

The present invention relates generally to transmission apparatus and particularly to versatile transmissions, susceptible to a broad range of applications, through which motive power is transmitted continuously, smoothly, and positively from an input element to an output element with a predetermined velocity ratio.

There are numerous types of transmission systems available today, each having characteristics making it best suited for particular applications. Thus, the well known belt transmission drive is often used to couple remotely located driving and driven elements whose axles and planes of rotation may be parallel or non-parallel. For low power transmission, flexible shafts can be employed. Where the axes and planes of rotation are parallel, chain drives are utilized to transmit motion without slippage and can handle higher loads than belt or flexible cable drives. Another example of continuous transmission means, the gear drive, provides in its various forms, a highly efficient mode of changing speeds and transferring power between shafts. Gear trains can be used to change shaft direction, and provide a positive, non-slip drive.

The operation of the various known transmission systems mentioned briefly above, are based on several different mechanical concepts and no single system can be applied to the myriad of installations encountered by the design engineer. It is the absence of a unitary mechanical concept which contributes, in part, to the complexities of selecting a proper drive system for a particular application. The designer must carefully weigh the advantages and disadvantages of each available transmission type. Thus, for example, where a relatively long distance separates the input and output shafts, a gear train, although efficient and capable of handling large loads, may not be feasible because of the large center-to-center distance, and a belt drive may appear more suitable on this basis. However, the problems of belt slippage and flexing and speed limitation must then be considered.

Summary of the invention

In the present invention, a unitary transmission concept is utilized which, in its various forms of embodiments, provides many of the desirable aspects of prior transmission devices. Besides having exceptional versatility in that a positive, high torque transfer drive is provided which may be used, for example, to couple inputs and outputs at any relative orientation, the transmission of the present invention may be used to provide plural compact outputs driven by a single input device, making available various speed ratios and directions of motion. High torque, high gear ratios, of the magnitude now available only from planetary gear systems or worm drives, are made possible with input and output members which may be separated by relatively large distances and which may be positioned in any fashion with respect to one another to suit virtually any application. The concept underlying the present invention is applicable to all modes of motion transmission—linear to linear, linear to rotary, rotary to rotary, and rotary to linear.

A transmission according to the broad aspects of the present invention includes first and second elements movable relative to one another, each element having a periodically or cyclically undulating surface. The undulating surfaces of the elements are coupled by oscillator means traversing the undulating surfaces during relative movement of the first and second elements. The profiles of the undulations are such that simple harmonic motion is generated in the oscillator means. If the number of undulations per unit length on the first element is different than the number of undulations per unit length on the second element, then a velocity ratio is established between the first and second elements in accordance with the ratio of the number of undulations per unit length on one element to the number of undulations per unit length on the other element. This velocity ratio is derived from the fact that the length of time required for a wave cycle on the element having the longer undulations to move past a reference (such as the oscillator means), must be the same as the time required for the wave cycle on the element having the shorter undulations to move past the same reference.

In a practical embodiment of the invention, the oscillator means comprises a plurality of substantially non-elastic, equally spaced members supported by a carrier element which may be mounted for movement relative to the first and second elements. In this way, any one of the three elements may serve as the drive input, with either one or both of the remaining elements functioning as the output. Three velocity ratios and their reciprocals, for a total of six ratios, are thereby made available. The oscillators may be in the form of solid members or may comprise fluid columns interconnecting piston assemblies traversing the undulating surfaces. The three basic elements may be concentrically disposed for operation in a planetary mode to provide rotary-to-rotary motion. The elements may also be constructed in linear form for linear-to-linear operation, or a combination of linear and rotary elements may be employed for the conversion of rotary motion to linear motion or vice-versa.

The use of fluid column oscillators provides an exceptional degree of flexibility and versatility. The planes and axes of rotation of the input and output elements may be oriented in any manner relative to one another, and the elements themselves may be spaced relatively far apart. By providing the output ends of the fluid columns with large cross-sectional areas relative to the input ends, hydraulic amplification results, producing large output torques. The fluid coupled version also makes possible the utilization of plural outputs having different speeds and directions of rotation by connecting several outputs in parallel with a single input.

Detailed description

Figure 1:
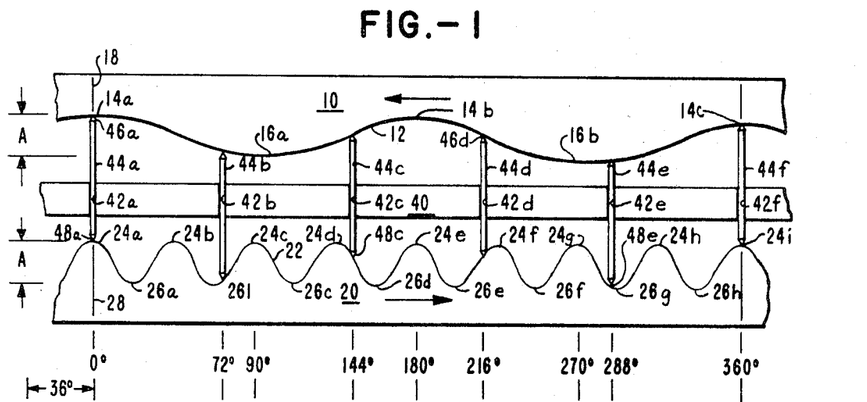
FIG. 1 is a schematic, elevation view of part of a rectilinear version of the present invention in which mechanical oscillators are employed, the oscillators being spaced so that the cam members move in opposite directions.
Figure 2:
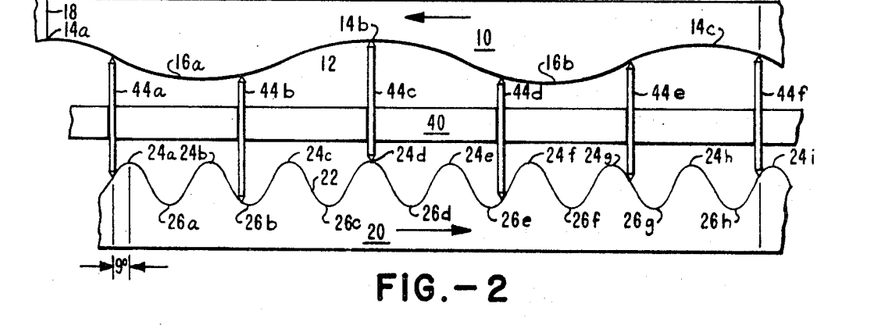
FIG. 2 is a schematic, elevation view of the mechanism of FIG. 1 showing the relative positions of the various elements following a given displacement of the input.

The concepts and principles underlying the present invention may best be understood by referring to FIGS. 1 and 2. A rectilinear motion transmission is depicted, in somewhat schematic form, which includes a first plate cam member 10, of any desirable length, having a periodically or cyclically undulating wave surface 12. In the version of the invention depicted in FIGS. 1 and 2, the waveform of the surface 12 is sinusoidal with points of maximum amplitude 14a, 14b, 14c, etc., and points of minimum amplitude 16a, 16c, etc. The total amplitude is designated by the letter A. Referring to the angular coordinate scale between FIGS. 1 and 2, it will be seen that for a distance set arbitrarily as $2\pi$ radians or 360°, the waveform 12 completes two cycles from a reference line 18, which, in FIG. 1, is in alignment with 0° on the scale.

The transmission of FIGS. 1 and 2 further includes a second plate cam member 20, coplanar with the cam member 10 and having a sinusoidal wave surface 22 in opposition to the wave surface 12 on cam member 10. Referring to the angular coordinate scale, the waveform 22 in the particular example shown in FIGS. 1 and 2 is the fourth harmonic of the wave 12 since it repeats itself four times for each cycle of wave 12. The wave surface 22 has points of peak amplitude 24a, 24b, 24c, etc., and points of minimum amplitude 26a, 26b, 26c, etc., the total amplitude of the waveform 22 being the same as wave 12 and therefore also designated by the letter A. In the portion of the transmission shown in FIG. 1, a reference line 28 on the cam member 20 is in alignment with the 0° line of the scale. Each of the cam members 10 and 20 is constrained by suitable means (not shown) to move linearly in the horizontal direction. Although the waveform 22 on the member 20 in this particular example is the fourth harmonic of the wave 12, it should be noted that in the linear versions of the invention, any wave ratio between the members 10 and 20 may be employed.

Mounted between the elements 10 and 20 is an elongated oscillator carrier 40 having a plurality of vertically oriented holes 42 formed therein at equal intervals. Slidably received within the holes 42, to move in a vertical direction relative to the carrier 40, are oscillators 44a, 44b, 44c, etc., of equal length and which may be in the form of a rigid rod or dowel. Each oscillator has an upper pointed end 46 bearing against the cam surface 12 and a lower pointed end 48 bearing against the cam surface 22. Again referring to the angular coordinate scale, it will be seen that in the specific example of FIGS. 1 and 2, the oscillator rods 44 are spaced 72° apart. Hence, five oscillators span a distance of 360°. With the various elements positioned as shown in FIG. 1, rod 44a is at the upper dwell point with its upper end 46a exactly opposite the trough point 14a and the lower point 48a opposite the peak 24a of the element 24. The oscillator rods 44b through 44e, at the 72, 144, 216, and 288 degree positions, respectively, are at some point in their vertical travel between the upper and lower dwell points.

It will be apparent that any one of the three elements 10, 20 or 40 may function as the input with any one of the remaining elements comprising the output. Since there are six such combinations, six linear velocity ratios may be provided utilizing the mechanism shown. To begin with, assume that cam 10 is the input and the output motion is derived from cam 20. In this case, it will be assumed that the carrier 40 is held fixed with respect to an arbitrary reference, for example, the angular coordinate scale. In the instantaneous position of the mechanism shown in FIG. 1, and with motion imparted to element 10 in the direction indicated by the arrow, a driving force from the cam 10 to the cam 20 is transmitted through the oscillators 44b and 44d. These elements are cammed by the surface 12 in a downward direction to act against corresponding portions of the surface 22. Thus, the vertical movement of the oscillators is translated back to a horizontal movement of the cam 20 in the direction shown by the arrow. The direction of the cam 20 is opposite to that of cam 10 because the slopes of the cam surface 12 between the points 14a and 16a and between 14b and 16b are opposite in sense to the corresponding slopes of the surface 22 between the points 26b and 24c, and between 26e and 24f, respectively. In the position shown in FIG. 1, oscillators 44a, 44c and 44e are not contributing to the transmission of motive force from the cam 10 to the cam 20. As pointed out earlier, the element 44a is at its upper dwell point. The oscillators 44c and 44e, on the other hand, are being driven up by the cam surface 22 back to their upper dwell position. Thus, at this point, the work done by the oscillators 44b and 44d is expended both in driving the cam 20 and in returning the oscillators 44c and 44e to their upper dwell position.

Referring now to FIG. 2, the relative positions of the elements are shown after the element 10 has been moved 36° to the left. In this instantaneous position, the oscillator 44c is at its upper dwell point, and oscillator 44b is on its way up, having passed through its lower dwell point, and oscillator 44e is continuing its upward stroke. In the phase depicted in FIG. 2, motion is therefore being transmitted by the oscillators 44a and 44d which are now being driven downwardly by the cam surface 12, the downward motion of these elements being translated into the horizontal motion of cam 20. Since the oscillators 44 are rigid and of constant length, the velocity ratio between the elements 10 and 20 is derived from the fact that the distance between adjacent maximum and minimum points on one element must be traversed, with respect to an arbitrary reference point, in the same time as the distance between adjacent maximum and minimum points on the other element. Since the cam 20 has four times the number of cycles per unit length as the cam 10, it will be apparent that the element 10 has a velocity four times that of the element 20. Thus, as shown in FIG. 2, when the element 10 has moved to the left 36°, the element 20 has moved to the right 9°. Another way of looking at this is that the frequency of the waves 12 and 22 past a stationary reference, such as the 0° line of the angular coordinate scale, will be the same and oscillators will reciprocate at that frequency with simple harmonic motion.

Thus, the mechanism depicted in FIGS. 1 and 2 provides a velocity ratio of 4:1 when the carrier 40 is fixed, the cams 10 and 20 serving as the input and output, respectively. Conversely, if the cam member 20 is the input element and the cam 10 is the output, a velocity multiplication of 1:4 is produced, with the directions of motion of the cams against being opposite to one another. Consider now the effect of holding the cam member 10 stationary and introducing an input movement, to the right, to the carrier element 40. For every 4 units of displacement of the carrier element relative to the fixed cam 10, the output cam 20 moves 5 units in the same direction, furnishing a velocity increased ratio of 4:5. In contrast, considering the cam 20 as the input and the carrier 40 as the output, still holding the cam 10 stationary, a velocity ratio of 5:4 is realized. Lastly, with the cam 20 stationary, 4 units of displacement of the cam 10 produces 1 unit of displacement in the same direction of the carrier 40. Again, the converse is true in that 1 unit of input to the carrier element 40 provides 4 units of movement in the same direction from the output, which in this case is cam 10. Thus, three velocity ratios and their reciprocals are available. As a further illustration of this, if the cam member 20 is provided with 5 cycles per 360°, the ratios available for the same combinations of inputs and outputs as recited above are 5:1, 1:5, 5:6, 6:5, 6:1 and 1:6, respectively. As before, the directions of travel will be opposite for the first two ratios listed and in the same direction for the remaining ratios.

Figure 3:
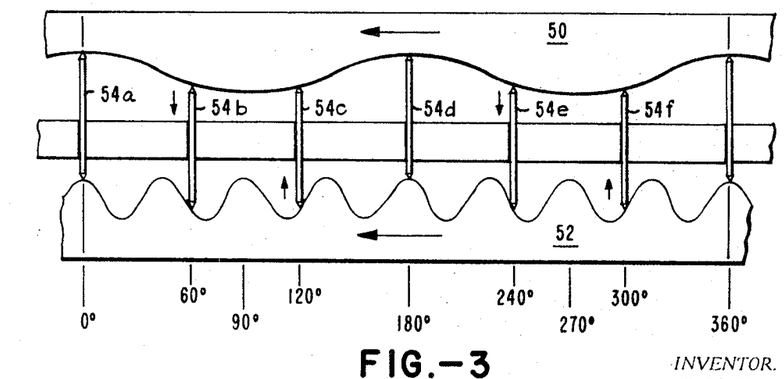
FIG. 3 is a schematic, elevation view of part of a rectilinear version of the invention in which the oscillators are spaced so that the cam members move in the same direction.

For a given ratio between the number of undulations per unit length on the cam members, the direction of motion of one cam relative to the other cam may be chosen by appropriately spacing the oscillators. Turning to FIG. 3, a 4:1 ratio transmission is shown in which an input to the upper plate cam 50, directed as indicated by the arrow, results in a movement of the driven plate cam 52 in the same direction. In constrast to the arrangement of FIGS. 1 and 2, the spacing between the oscillators 55a, 54b, 54c, etc. in FIG. 3 is 60° and thus there are six oscillators per 360°. Paired oscillators separated by 180° will always be in phase with one another. The instantaneous, relatives positions of the transmission elements in FIG. 3 are such that the only oscillators 54b and 54e are in the driving phase. Since the slope of the portion of the cam 50 driving the oscillators always has the same sense as the slope of the portion of driven cam 52 acted upon, the direction of motion of the cam members is the same.

Figure 4:
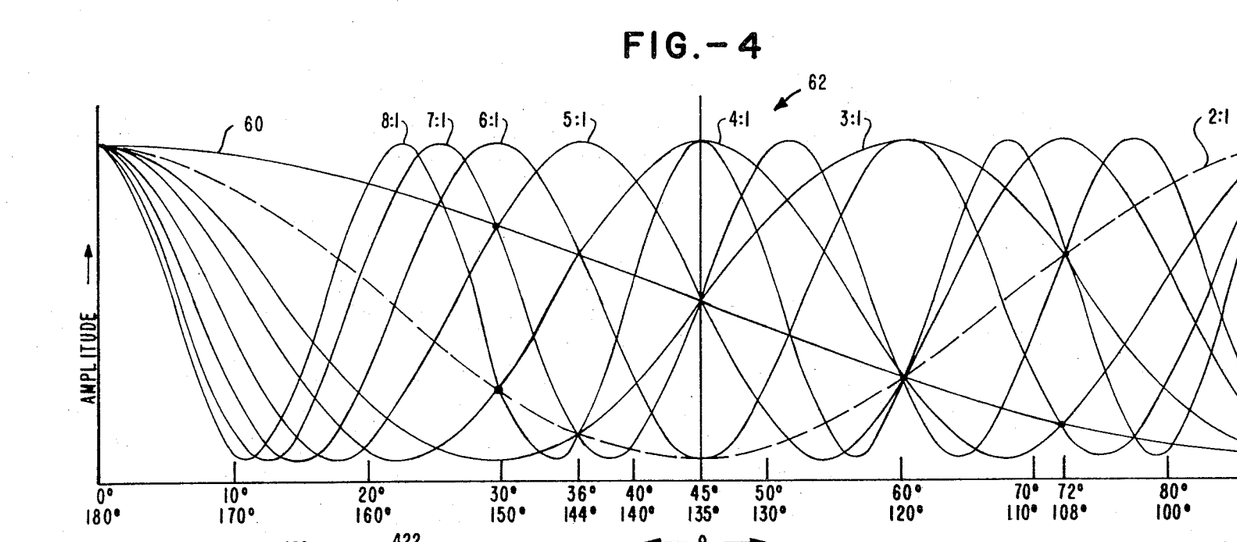
FIG. 4 shows a set of curves relating the waveforms of the cam members with the spacing of the oscillators to permit selection of velocity ratios and relative directions of travel of the cam members.

The graphical representation of FIG. 4 is useful for selecting desired drive ratios and relative directions of motion of the cam members where one of the cam members, for convenience referred to as the driving or input cam, is provided with two complete cycles in 360°, such as the cam 10 in FIG. 1. The sine wave 60, which may be considered the base or fundamental curve, represents ¼ of two wave lengths of the input cam, or 90°. Because the wave shape between 90° and 180° is a mirror image of the shape between 0° and 90°, the angular coordinate scale along the abscissa includes the graduations from 90° to 180° extending from right to left. Plotted along with the base curve are a series of harmonic curves 62 ranging from the second to the eighth harmonic and representing velocity ratios from 2:1 to 8:1, respectively. The harmonic curves represent the waveform of the output member such as the cam 20 in FIG. 1. Keeping in mind first, that for rigid, constant length oscillators, the amplitudes of the input and output waveforms will be the same and second, that the oscillators are positioned at phase angles common to both input and output cams, it can be concluded that the intersections of the base curve 60 with the harmonic curves 62 designate the minimum angular intervals between oscillators. Further, if the slope of a given harmonic curve has the same sense as the slope of the fundamental curve at the point of intersection, the directions of motion of the input and output cams will be the same. Using the 4:1 ratio curve as an example, intersections with the base curve occur at 36°, 60° and 72° and again at 108°, 120° and 144°. The slopes of the two curves at 36°, 72°, 108° and 144° have opposite senses, while the slopes at 60° and 120° have the same sense. The examples of FIGS. 1 and 3 are applications of the foregoing. It will also be appreciated that the number of oscillators in FIG. 1 may be doubled to ten, spaced 36° apart, and the number of oscillators in FIG. 3 may be halved to three at intervals of 120°. The principles of the invention may be extended to almost any desired ratios between input and output.

Figure 5:
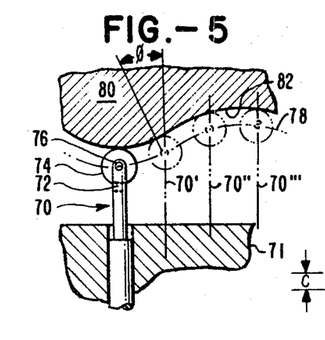
FIG. 5 is a fragmentary, front elevation view of an alternate form of oscillator employing roller contact elements and illustrates a graphical method which may be used to determine the profiles of the cam members.

It is desirable to transmit motion between the elements with the least amount of frictional losses and side loadings. The mechanisms of FIGS. 1–3 obviously have inherent limitations from the standpoint of friction and side loads in that a sliding contact is utilized between the cam members and the oscillators. To reduce friction, the oscillators may be provided with rollers at their opposite ends to engage the cam surfaces. Details of such an arrangement are shown in FIG. 5 in which an oscillator 70, supported by a carrier 71 is provided with a forked end 72 for receiving a small roller 74 rotatable about, and held in place, by an axle 76. Since the axle 76 undergoes simple harmonic motion in the vertical direction, thereby generating a sine curve 78, the shape of the cam surface 82 of the cam member 80 may be determined by conventional cam layout and design methods. Thus, if the oscillator 70 is assumed to move relative to the cam 80, the curve drawn tangent to the roller at successive positions 70′, 70″, 70‴, etc., defines the envelope of the contact points between the roller and the cam 80 and hence the shape of the cam surface 82. As is well known, the wave will not be sinusoidal because the contact point never lies on a radius of the roller 74 which is coincident with the vertical axis of the oscillator 70 except at the upper and lower dwell points. Thus, a pressure angle $\phi$ is produced which must be limited in accordance with conventional cam design practices so as not to cause excessive frictional loads and side loading on the member 70. In addition, also in accordance with established cam design practices, certain limitations must be observed in the relationship between the radius of the roller 74 and the minimum radii curvature of the cam surface 82. Because all of the foregoing relate to standard techniques, which may be found in any of the multitude of standard reference works on cam design, a detailed discussion of this aspect of the apparatus will not be pursued.

Figure 6:
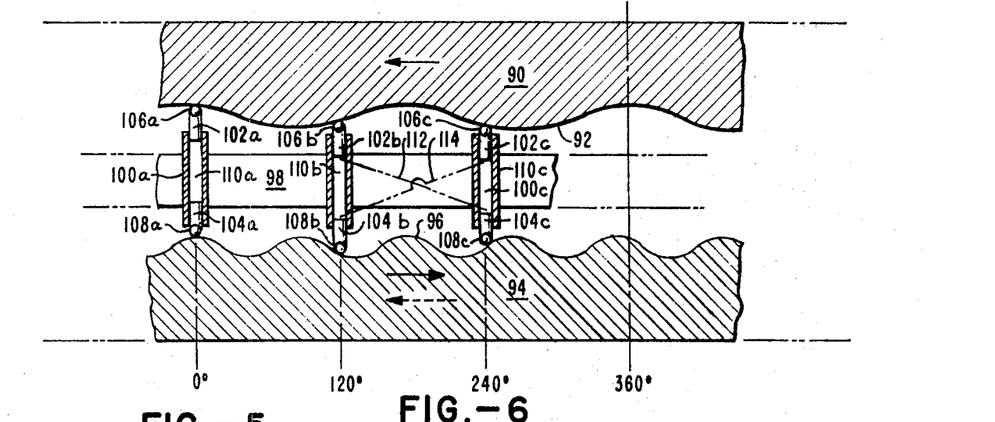
FIG. 6 is a schematic, elevation, cross-sectional view of part of a rectilinear example of the invention in which the oscillators are in the form of hydraulic columns.

Greater flexibility may be afforded with respect to the placement and orientation of the cams relative to one another by utilizing hydraulically coupled oscillator elements. One version of this approach is depicted in FIG. 6. In this example of the transmission of the present invention, there is provided a first cam member 90 with two wave repetitions every 360° along the surface 92, a second cam member 94 with four repetitions every 360° along the surface 96, and a centrally disposed carrier 98. The carrier 98 supports a plurality of vertically oriented tubes 100a, 100b, 100c, etc., spaced 120° apart, which may be threadedly received within holes provided in the carrier 98. The ends of the tubes 100 project from the upper and lower surfaces of the carrier 98. Slidably received in the upper and lower extremities of the tubes 100 are pistons 102 and 104, respectively. The outer ends of the pistons 102 and 104 may be pointed for sliding contact with the cam surfaces 92 and 96 much the same as that shown in FIG. 1. As an alternative, shown in FIG. 6, the ends of the pistons 102 and 104 are cupped to receive small spherical bearings 106 and 108 respectively, for engaging the cam surfaces. A ball and socket configuration of this sort may, by appropriate design and choice of materials, be made relatively friction free. Coupling the inner faces of the pistons 102 and 104 within the tubes 100, is a column of liquid 110 which oscillates in simple harmonic motion along with the pistons. Since the liquid 110 is virtually incompressible, a relatively rigid, constant length structure, comprising the ball and piston assembly and intermediate liquid column, results. Leakage of the liquid 110 around the pistons 102 and 104 may be minimized or prevented completely by the use of O-rings or other well known seal-means. The primary advantage of the fluid coupled version of the harmonic transmission is the flexibility which is afforded insofar as placement and orientation of the cam members 90 and 94 is concerned. Thus, remotely located cams may be coupled by utilizing long fluid lines to interconnect the pistons 102 and 104.

The hydraulically coupled transmission of FIG. 6, as just described, provides counter movement between the cams 90 and 94. By crossing over the fluid connection lines between an adjacent pair of oscillators, the cams 90 and 94 may be made to travel in the same direction. Thus, as indicated by the broken lines 112 and 114 which represent hydraulic connections, the pistons 102b and 104c, and 102c and 104b, respectively, may be interconnected.

In describing the operation of the configuration just discussed, it will be assumed that the carrier 98 is held fixed and that cam 90 serves as the input and cam 94 as the output. In the instantaneous position shown in FIG. 6, with the cam member 90 being driven to the left as shown by the arrow, only piston 102c can transmit force between the cam members. However, because of the phase relationship between the drive piston 104b, the driving force is transmitted to the cam 94 via a slope of the same sense. The cam 94 therefore moves to the left as shown by the broken arrow. As already explained, a velocity reduction accompanies the transfer of motion which in this case is 2:1 since there are two waves on the cam 94 for every one wave on the cam 90.

Figure 7:
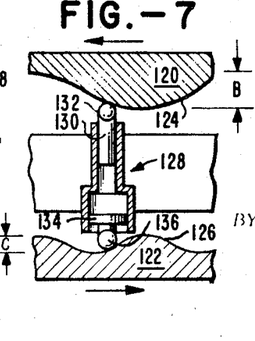
FIG. 7 is a schematic, elevation, cross-sectional view of part of a rectilinear version of the invention utilizing hydraulic column oscillators which multiply the force transmitted.

The oscillators described in connection with FIG. 6 may be modified as shown in FIG. 7. Cam members 120 and 122, have cyclically undulating surfaces 124 and 126, respectively, are coupled by hydraulic oscillators, as exemplified by oscillator 128, in which an upper piston 130, cooperating with the cam surface 124 through a ball 132, is of small diameter compared to a lower piston 134 acting upon the cam surface 126 through a ball 136. The hydraulic amplification provided by this device means that the upper piston 130 has a large travel designated by the letter B, while the piston 134 has a small travel, designated by the letter C. The ratio between the amplitudes B and C is inversely proportional to the area ratio of the pistons. An advantage of this modification is that a large number of cycles per unit length may be incorporated in the surface 126 since the force amplification is available to overcome relatively high pressure angles.

FIGS. 8–14 are examples of rotary transmissions according to the invention in which mechanical oscillators are employed and in which the basic transmission elements are concentrically disposed about a central axis of rotation. It should be borne in mind that there are innumerable combinations and permutations of the shapes, orientation, cooperation, and other parameters associated with the elements to be described, and the following merely comprises descriptions of several examples.

Figure 8:
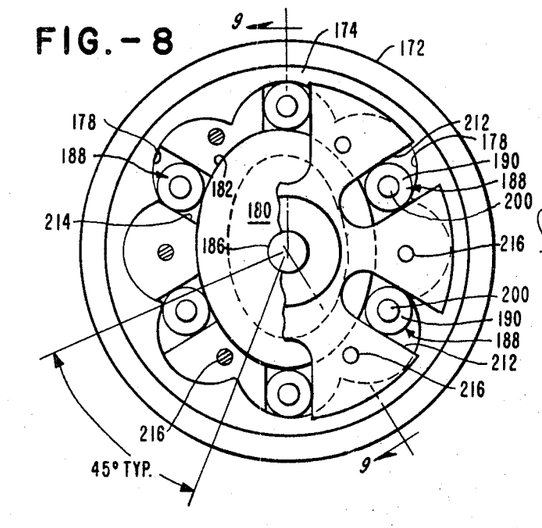
FIG. 8 is a transverse sectional view, partially broken away, of an example of a rotary-to-rotary motion, coaxial transmission according to the present invention.
Figure 9:
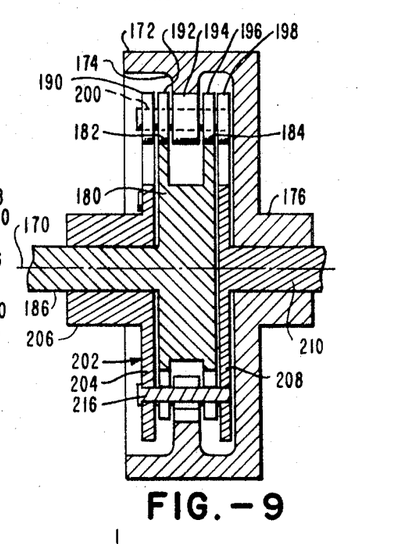
FIG. 9 is an axial sectional view of the transmission of FIG. 8 taken along the plane 9—9.

In FIGS. 8 and 9, a rotary transmission is shown suitably mounted for rotation about a central axis 170. This transmission includes an outer, cylindrically-shaped casing 172 having a flange 174 projecting radially inwardly from its inner surface, and a sleeve 176 projecting outwardly and positioned concentrically with the central axis 170. The inner surface of the flange 174, designated by the reference numeral 178, has cyclical undulations to form one of the cam elements of the transmission. In this particular case, the undulations repeat eight times in 360°, the angle subtended by each wave therefore being 45°. Mounted inside the casing 172 for rotation about the central axis 170, is a second cam 180 having axially spaced wave surfaces 182 and 184 and a projecting shaft 186. In this particular example, the undulations of the surfaces 182 and 184 complete two cycles in 360°, thereby producing a 4:1 ratio transmission. Coupling the cam members 174 and 180 are a plurality of oscillator assemblies 188. In the particular embodiment shown, six oscillators, spaced 60° apart, are utilized. Each oscillator assembly 188 includes five small rollers 190, 192, 194, 196 and 198 of equal diameter and mounted to rotate independently on an axle 200. The oscillator assemblies 188 are mounted to reciprocate along radii extending from the axis 170, the angular intervals between the oscillator assemblies being maintained by a carrier assembly 202. The rollers 194 ride in continuous contact with the cam surface 178 and the wheels 192 and 196 ride along the cam surfaces 182 and 184. The carrier assembly 202 includes a front plate 204 having an outwardly projected sleeve 206 concentric with the axis 170 and a rear plate member 208 having a rearwardly projecting shaft 210 for connection to appropriate external devices. Each of the plates 204 and 208 is provided with six radial slots 212 and 214, respectively, and the wheels 190 and 198 ride freely within these slots. The carrier plates 204 and 208 are joined at 60° intervals, intermediate the slots 212 and 214, by means of pins 216 oriented parallel to the central shaft 170. In the operation of the apparatus shown in FIGS. 8 and 9, any of the shaft elements 176, 186, 206, or 210 may serve as the input with one or more outputs being derived from the remaining elements. The transmission under discussion is a particularly low friction, high efficiency device which may obviously be greatly simplified to form an extremely low cost motion transmitter.

Figures 10, 11:
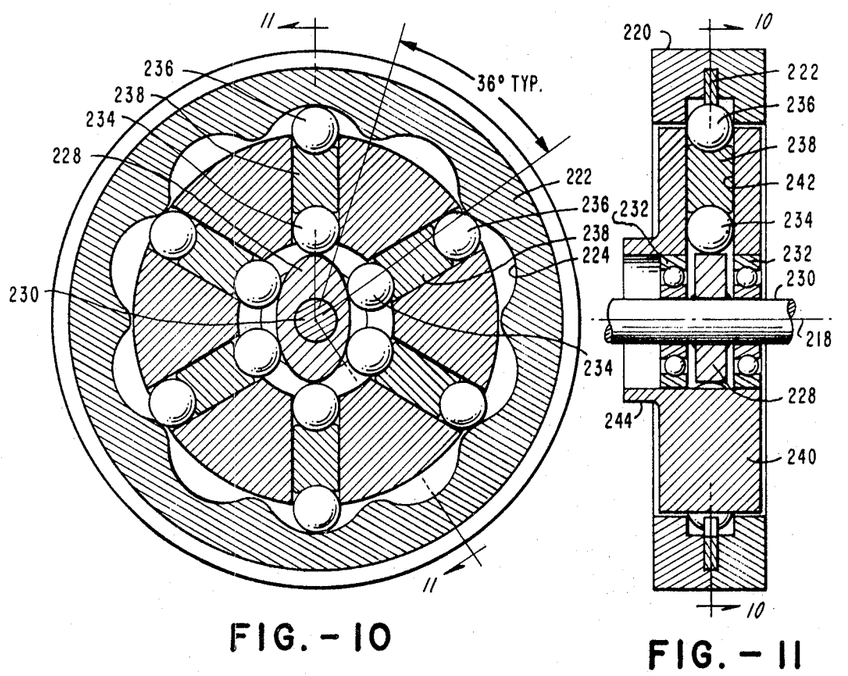
FIG. 10 is a transverse sectional view, partially broken away, of another example of a rotary-to-rotary motion, coaxial transmission according to the invention.
FIG. 11 is an axial sectional view of the transmission of FIG. 10 taken along the plane 11—11.

FIGS. 10 and 11 show an example of a coaxial, rotary-to-rotary motion transmission, which in many respects is similar to that in FIGS. 8 and 9. Here an outer, cylindrical split case 220, concentric with an axis 218, is provided which houses an outer cam element 222 in the shape of an annular ring. In this case, the cam element 222 has ten waves, spaced 36° apart, along its inner periphery 224. An inner cam member 228, mounted on a shaft 230 rotates inside the case 220 about the axis 218. The cam 228 has two lobes, a basic velocity ration of 5:1 thereby being made available from this device. The assembly comprising the inner cam 228 and shaft 230 are mounted for rotation in the bearings 232.

The oscillators in the transmission of FIGS. 10 and 11 include inner and outer spheres 234 and 236 in contact with the inner and outer cams 228 and 222, respectively, and spaced apart by means of spacers 238 having cupped ends for receiving the spheres. Mounting the oscillators and the maintenance of the appropriate angular spacing between oscillators are provided by cylindrical carrier 240 having radial holes 242 within which the oscillators ride. The carrier 240 is provided with a protruding sleeve 244 which may be adapted to connect to external driving or driven devices.

Figure 12:
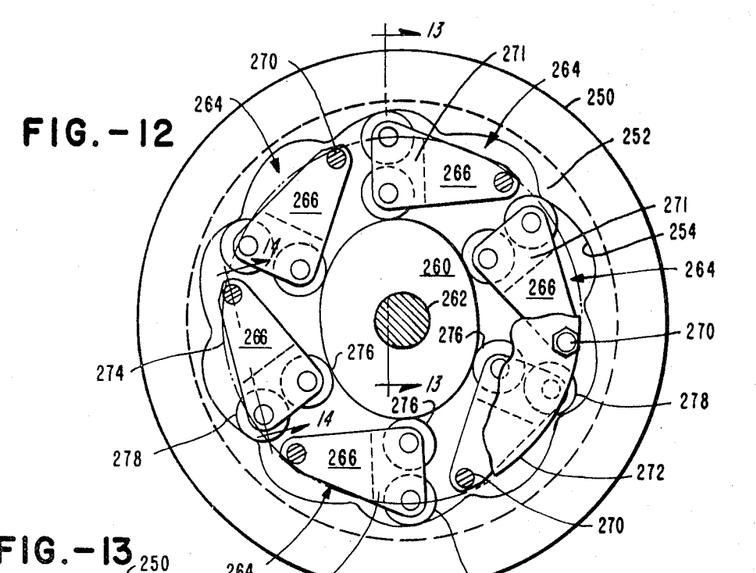
FIG. 12 is a transverse sectional view, partially broken away, of a rotary-to-rotary motion, coaxial transmission according to the invention in which pivotally mounted oscillators are employed.
Figures 13, 14, 20:
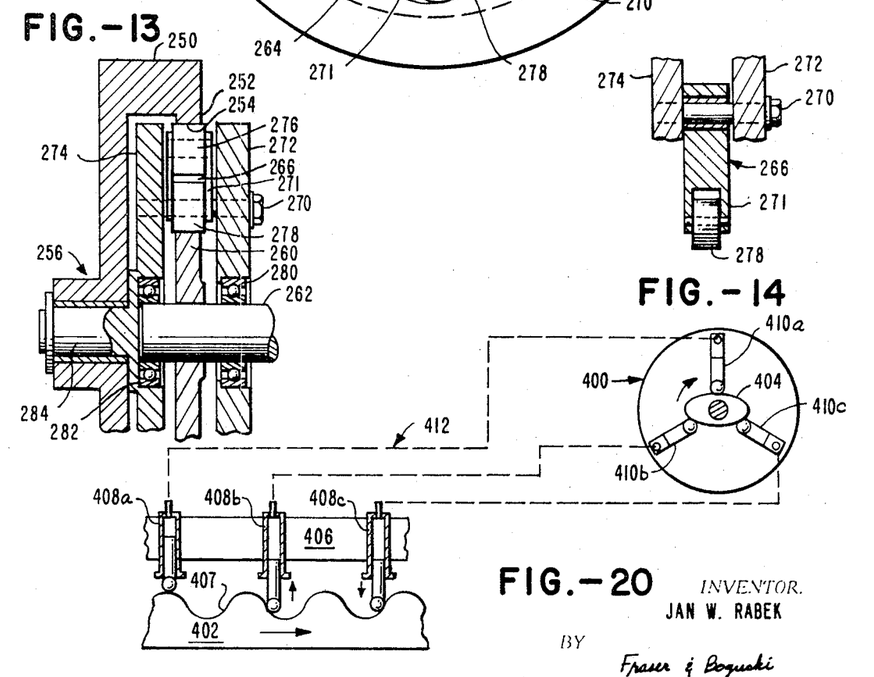
FIG. 13 is an axial sectional view of a portion of the transmission of FIG. 12 as taken along the plane 13—13.
FIG. 14 is an axial sectional view of one of the pivoted oscillators of the transmission of FIG. 12 as seen along the plane 14—14.
FIG. 20 is a schematic representation of a rotary-to-linear motion, hydraulically coupled transmission in accordance with the teachings of the invention.

FIGS. 12–14 relate to an example of the rotary version of the transmission in which a number of pivotally mounted oscillators couple the cam members. The cams are profiled so as to produce angular simple harmonic motion of the oscillators. The transmission comprises an outer housing 250 having an inwardly directed flange 252 whose inner peripheral surface 254 is provided with the desired number of undulations, in this case ten. The housing 250 includes a rearwardly projecting, coaxial sleeve and bushing assembly 256. The inner cam element 260, similar to those described in connetcion with FIGS. 8–11, is mounted on a central shaft 262. The oscillators, designated generally by the reference numerals 264, each a triangularly shaped arm 266, rotatably mounted at its apex about an anchor pin 270, and provided with a forked end 271. The anchor pins 270 are supported by front and rear carrier plates 272 and 274, respectively. The inner and outer cam profiles are bridged by pairs of rollers 276 and 278 suitably supported for rotation within the forked end 271. The shaft 262 is mounted in bearings 280 and 282, the outer races of which are supported by the plates 272 and 274, respectively. The rear carrier plate 274 has a projecting hub 284 which rides within the bushing assembly 256.

Basically, the operation of the mechanism of FIGS. 12–14 is similar to that already described in connection with the previous examples. The significant difference is that the oscillators pivot about their anchor pins 270 with simple harmonic motion and the cam profiles, in order to produce such motion, will not be symmetrical.

Rotary, hydraulically coupled transmissions applying the principals under discussion are shown in FIGS. 15–19. The rotary transmission in FIGS. 15 and 16 comprises generally two cylindrical structures 300 and 302 interconnected by a series of hydraulic lines 304. It may be assumed for purposes of this discussion that the structure 300 is the input element and structure 302 the output element. These functions, of course, may be reversed. The structure 300 includes an internal, cylindrically shaped stator 306 having stub shafts 308 and 310 projecting from the front and rear faces, respectively, concentrically with the rotational axis 312. The stator 306 is further provided with a plurality of radially-oriented bores 314 in communication with the outer peripheral surface of the stator. In the present example, there are six such bores and they are equally spaced at 60° intervals. Disposed about the stator 306, in concentric relationship therewith, is an annular rotor 316. The rotor 316 may be conveniently constructed in three pieces. These include a generally disc-shaped front plate 318, a cam member 320 in the form of an annulus, and a disc-shaped rear plate 322. The cam member 320 has an inner peripheral surface 323 with a number of periodic undulations. The elements 318, 320, and 322 are all mounted concentric of the axis of rotation 312 and are joined together by a number of fasteners such as bolts 324, disposed about the periphery at equal intervals. The front plate 318 is provided with a forwardly projecting sleeve 326 having an inner surface 328 dimensioned for a running fit with the stub shaft 308.

Figures 15, 16:
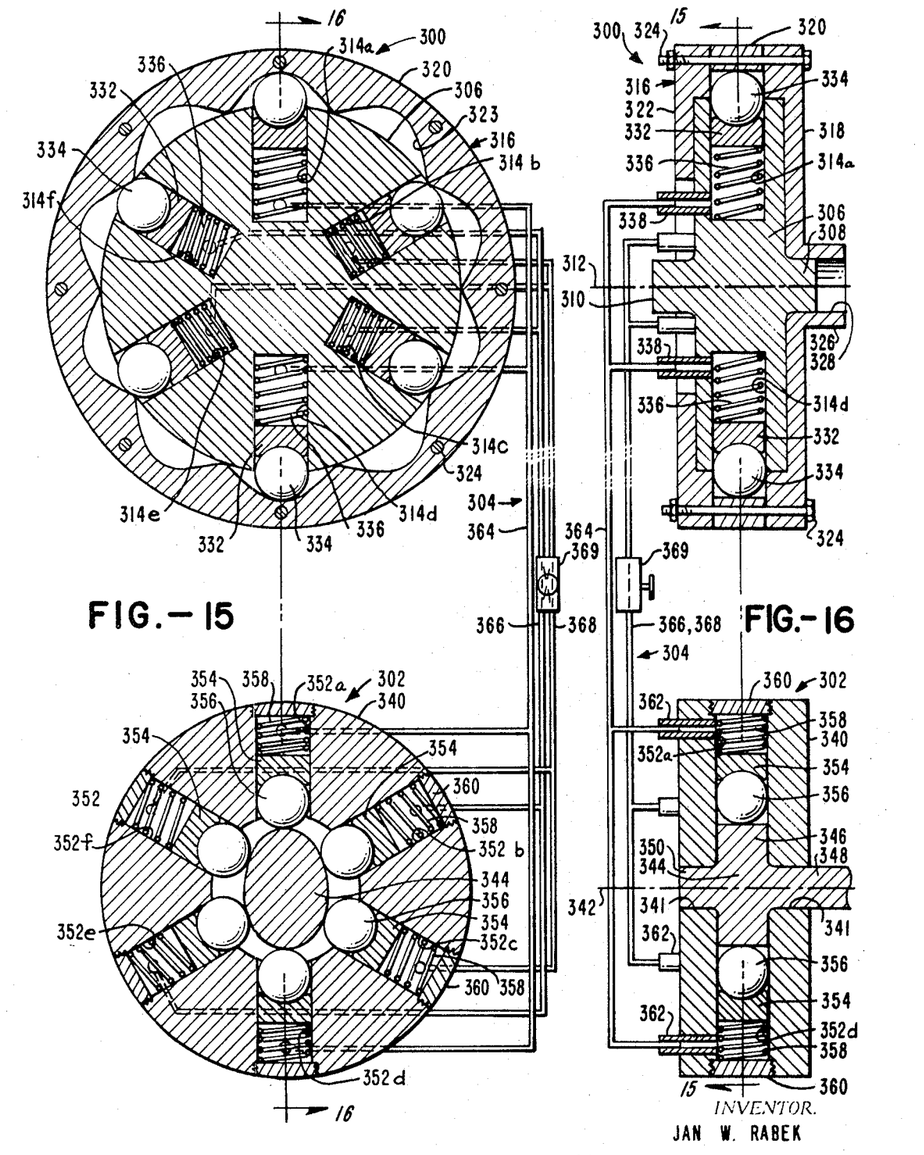
FIG. 15 is a transverse sectional view, partially broken away, of a rotary-to-rotary motion, hydraulically coupled transmission in accordance with the present invention.
FIG. 16 is an axial sectional view of the transmission of FIG. 15 taken along the plane 16—16.

Inside each bore 314 there is provided an oscillator including a piston 332 cupped at its outer end to receive a spherical contact member 334. A light spring 336 interposed between the inner surface of the piston 332 and the bottom surface of the bore 314 biases the oscillator outwardly so that the sphere 334 is maintained in constant contact with the inner, undulating surface 323 of the cam 320. The spring 336 thereby reduces the effort required to return the oscillator 330 from its innermost position to its outermost position. The stator member 306 further carries six, rearwardly projecting tubes 338 in communication with the lower extremity of the bores 314. The tubes 338 are connected to the output structure 302 in a manner to be described.

The output structures 302 comprises generally a cylindrically shaped stator 340 having a central aperture 341 and which is mounted fixed with respect to a rotational axis 342. Mounted for rotation within the stator 340 is a rotor 344 having a central portion 346 with two axially extending cam lobes 180° apart, and front and rear shafts 348 and 350, respectively, journaled in the aperture 341. The stator 340 is provided with six equally spaced cylindrical bores 352 with pistons 354, spheres 356, and bias springs 358 received therein in the same manner as already described in connection with the input structure 300. The outer end of the bores may be sealed by threaded caps 360. The stator 340 also supports a number of tubes 362 in communication with the outer extremities of the bores 352.

With respect to the connection between the input structure 300 and the output structure 302, a minimum number of three coupling oscillators are required in order for the apparatus to function continuously and smoothly. Thus, to satisfy the minimum conditions, the bores 314a, 314c, and 314e may be connected, respectively, to corresponding bores 352a, 352c, and 352e in the output structure 302. As already mentioned, the shaft loadings may be made symmetrical by utilizing all six oscillators. Pairs of cylinders, 180° apart, may therefore be connected to a common line to complete the connection. Hence, the line 364 connects cylinders 314a and 314d with cylinders 352a and 352d. Similar connecting lines 366 and 368 connect the remaining opposed pairs of cylinders on the input structure 300 with the corresponding cylinders in the output structure 302. As already discussed in connection with FIG. 6, if cross-over lines are provided between two adjacent oscillators, the input and output cam members will move in the same direction. The device of FIGS. 15 and 16 may thus be made reversible by the provision of a reversing valve 369, analogous to a double pole, double throw electrical switch, in the lines 366 and 368.

The operating principle of the rotary fluid transmission just described is the same as the linear device of FIG. 6, except, of course, the input and the output cam members have rotational motion instead of rectilinear motion. By coupling the structures 300 and 302 with flexible hosing, the relative orientation of the axes of rotation 312 and 342 can be anything desired. If a different ratio is needed, the cam members 320 and 344 may be easily replaced with cams providing the required ratio. Further, the force amplification technique of FIG. 7 may be employed by using different cylinder diameters on the input-output structures 300, 302.

Figure 17:
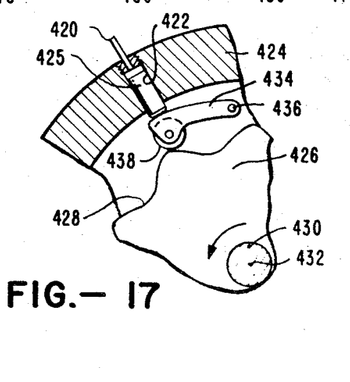
FIG. 17 is a transverse, fragmentary sectional view of the output element of a rotary-to-rotary motion transmission according to the invention in which combined hydraulic and mechanical coupling is utilized.

In FIG. 17, a portion of an output element is depicted which employs a combination hydraulic and mechanical oscillator device. The input or driving element may be similar to the rotary unit 302 shown in FIGS. 15 and 16, whose hydraulic lines are connected via tubes, such as 420 (in FIG. 17), to cylinders, such as 422, formed in a stationary ring 424. Piston 425 is slidably received within cylinder 422. A plate cam rotor 426, having an undulating outer surface 428, is mounted on a shaft 430 for rotation about a principal axis 432. The coupling between the pistons 425 and the wave surface 428 of the rotor 426 is furnished by angularly oscillating elements 434 pivoted about points 436 which are fixed with respect to the ring 424. The oscillating element 434 includes a roller 438 biased into continuous rolling contact with the surface 428 by the action of the pressurized fluid acting on piston 425. In operation, the hydraulic forces acting on the piston 422 via the oscillating elements 434 are translated into rotary motion of the cam 426. As the element 434 pivots, the piston 425 is free to slide along the upper surface of element 434. A plurality of oscillators are provided as already described in connection with previous embodiments to obtain a continuous, smooth transfer of motive power.

Figure 18:
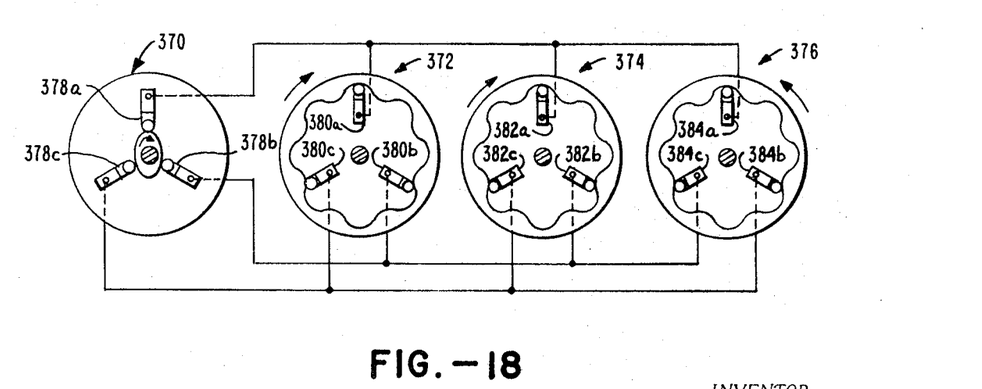
FIG. 18 is a schematic representation of a transmission according to the invention in which a rotary input element drives a plurality of rotary output elements.

In FIG. 18, a simplified schematic diagram shows how a single input device 370 may be connected to several output devices 372, 374 and 376 to achieve different ratios in combination with co-rotating and counter-rotating outputs. Basically the output devices are connected in parallel with each other and with the input. Outputs 372 and 374 are coupled for co-rotation with the input, the cylinders 380a, 380b, and 380c of the output 372, and the cylinders 382a, 382b, and 382c of the output 374 being connected in phase with the cylinders 378a, 378b, and 378c of the input. The output device 376, however, counter rotates relative to the input because cylinders 384b and 384c on the output are connected to 378c and 378b, respectively, on the input. Any number of output devices, oriented as desired with respect to the input, may be used.

Figure 19:
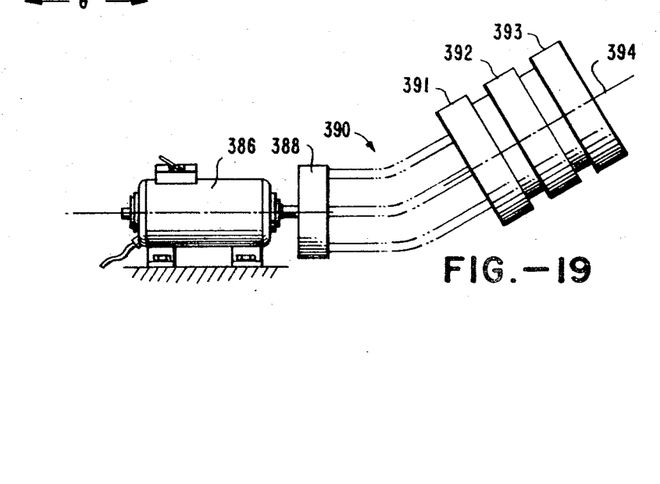
FIG. 19 is a side elevation view of a practical example of a rotary-to-rotary motion, hydraulically coupled transmission according to the invention.

FIG. 19 shows a practical example of a multiple output, hydraulic transmission applying the principles discused in relation with FIG. 18. A motor 386 drives an input device 388 which, in turn, is connected by hydraulic lines 390 to drive a series of outputs 391, 392 and 393. The outputs, in this example, are concentrically mounted about an axis 394, at some angle to the common motor-input device axis. This arrangement furnishes a plurality of high torque, balanced power take-offs from the outer peripheries of the units 391–393 which may be rotating with, or counter to, the input, and at substantially any velocity ratio required.

With reference now to FIG. 20, an example of the transmission of the invention is shown in which rotary motion from an input device 400 is translated into linear motion of an output 402. The transmission of FIG. 20 is essentially the same in concept and operating principle as the linear-to-linear motion, hydraulically coupled, transmission shown in FIG. 6 with the linear input element formed into a lobed rotor 404. A carrier 406, positioned proximate the undulating surface 407 of the plate cam 402, forming the output, carries a plurality of tubes 408a, 408b, 408c, etc., spaced apart at equal intervals in the proper phase relationship with the radially oriented cylinders 410a, 410b, 410c, etc., forming part of the input 400, and connected thereto by fluid lines 412. Rotation of the rotor 404 in the direction shown by the arrow, causes linear motion to the right of the plate cam 402. All of the considerations, with respect to choice of direction of movement, the hydraulic force amplification of FIG. 7, and so on, already discussed, apply in this example.

While there have been described above and illustrated in the drawings various forms and examples of harmonic oscillator transmissions, it will be appreciated that the invention is not limited thereto, so that all alternative forms, variations and modifications falling within the scope of the appended claims should be considered to be part of the invention.

What is claimed is:

1. Apparatus for transmitting a constant velocity ratio between an input and an output comprising:
a first element having a surface with periodic undulations formed therein;
a second element having a surface with periodic undulations formed therein, said first and second elements being mounted for motion relative to one another;
first oscillator means mounted to traverse the undulating surface of the first element, said surface being shaped to reciprocate the first oscillator means between dwell points of maximum and minimum amplitude in a direction generally transverse to the direction of motion of the first element, said first oscillator means comprising a first group of pistons, said pistons mounted for reciprocation in a first group of cylinders and provided with low friction means for contact with the undulating surface of said first element;
second oscillator means mounted to traverse the undulating surface of the second element, said surface of said second element being shaped to reciprocate the second oscillator means between dwell points of maximum and minimum amplitude in a direction generally transverse to the direction of motion of the surface of the second element, said second oscillator means comprising a second group of pistons, said pistons mounted for reciprocation in a second group of cylinders and provided with low friction means for contact with the undulating surface of said second element; and
a confined fluid column coupling each cylinder of said first group with a corresponding cylinder of said second group to transmit motion between the first and second elements, the ratio of the velocity of the first element to the velocity of the second element being such that during operation, when a given piston of the first group is at its maximum dwell point, the corresponding piston of the second group is at its minimum dwell point and when said corresponding piston is at its maximum dwell point, said given piston is at its minimum dwell point.

2. Apparatus, as defined in claim 1, which includes:
valve means connected in at least one adjacent pair of fluid columns for interchanging the connection between the corresponding cylinders of the first and second groups for selectively reversing the direction of relative movement between the first and second elements.

3. Apparatus, as defined in claim 1, in which:
the pistons of the first group have a cross-sectional area different from the pistons of the second group whereby fluid amplification is provided.

4. Apparatus for transmitting a constant angular velocity ratio between an input and an output comprising:
a first wave gear comprising an annular ring mounted for rotation about a first axis, the inner peripheral surface of said ring having a series of periodic undulations;
a second wave gear comprising a lobed rotor mounted for rotation about a second axis, the number of lobes of said rotor being an harmonic of the number of undulations on the first wave gear;
a stationary cylindrical member mounted concentrically within said first wave gear and including a plurality of equiangularly spaced, radial bores extending inwardly from the outer surface of said cylindrical member;
a first group of oscillators carried by said stationary cylindrical member, said first group of oscillators being adapted to traverse the undulating surface of the first wave gear and reciprocate between dwell points of maximum and minimum amplitude wtih respect to said first axis during traversal of said undulating surface, said first group of oscillators including pistons slidably disposed within said radial bores in said cylindrical member and biased outwardly toward the inner peripheral surface of the first wave gear, low friction contact means being interposed between each piston and said peripheral surface;
a stationary ring member disposed about said lobed rotor concentrically therewith and including a plurality of equiangularly spaced, radial bores equal in number to the bores in said cylindrical member and extending outwardly from the inner surface of said stationary ring member;
a second group of oscillators carried by said stationary ring member and disposed to traverse the outer surface of said lobed rotor and reciprocate between dwell points of maximum and minimum amplitude with respect to said second axis during traversal of said outer surface of said lobed rotor, said second group of oscillators including pistons slidably disposed within said radial bores in said stationary ring members and biased inwardly toward said lobed rotor, low friction contact means being disposed between each piston and the outer surface of said lobed rotor; and a fluid line coupling the radially inner portion of each bore in said stationary cylindrical member with the radially outer portion of a corresponding bore in said stationary ring member, the oscillators of the first group being positioned angularly relative to the oscillators of the second group so that when a given oscillator of the first group is at the dwell point of maximum amplitude, the corresponding oscillator of the second group will be at a minimum amplitude, corresponding paired sets of oscillators being spaced to oscillate between maximum and minimum dwell points in out-of-phase relationship to transmit motion between said first and second wave gears continuously and smoothly by camming action, the number of oscillators being determinative of the relative direction of rotation of said wave gears.

5. Apparatus, as defined in claim 4, in which:
three bores are provided in each carrier member, spaced 120° apart, with oscillations of the fluid columns and their corresponding piston assemblies being 120° out of phase.

6. Apparatus, as defined in claim 5, which includes:
a selector valve in two of the fluid lines for reversing the connection between the corresponding bores on the first and second carrier members whereby the direction of rotation of one wave gear relative to the other may be reversed.

7. Apparatus, as defined in claim 4, in which:
six bores are provided in each carrier member spaced 60° apart, bores 180° apart in each carrier member being connected to a common fluid line.

8. Apparatus, as defined in claim 4, in which:
the bores in one of the carrier members are of a different diameter than the bores in the other carrier member for providing fluid amplification.

9. Apparatus, as defined in claim 4, which includes:
a plurality of units similar to the assembly including the first wave gear and first carrier member, said units being connected in parallel with the second wave gear unit whereby a plurality of outputs having different ratios and different directions of rotation is provided.

10. Apparatus for transmitting a constant angular velocity ratio comprising:
an outer cylindrical casing disposed concentrically about a central axis and including an annular rim having an inwardly directed flange, said flange having an inner peripheral surface with periodic undulations formed therein, said casing including means concentric of said axis for coupling to external input or output means;

a rotor mounted within said casing concentric of said axis, said rotor having a pair of identical, axially spaced wave surfaces, the number of waves on each wave surface being an harmonic of the number of undulations on the inner peripheral surface of said outer casing flange, said rotor including means concentric of said axis for coupling to external input or output means;

an oscillator carrier concentric of said axis including a pair of axially spaced, interconnected, circular plates sandwiching said rotor, said plates including a plurality of equiangularly spaced, axially aligned, radially extending slots, said carrier including means concentric of said axis for coupling to external input or output means; and a plurality of oscillator assemblies carried by said carrier, each said assembly including five axially spaced wheels mounted for independent rotation on a common shaft extending parallel with said axis, the pair of end wheels riding within corresponding axially aligned slots of said carrier plates, the center wheel riding against the undulating surface of said outer casing flange and the pair of intermediate wheels riding against the spaced wave surfaces of said rotor.

11. Apparatus for transmitting a constant angular velocity ratio comprising:
an outer annular casing disposed concentrically about a central axis and including an inwardly directed flange, said flange having an inner peripheral surface with periodic undulations formed therein, said casing including means concentric of said axis for coupling to external input or output means;

a lobed rotor, substantially coplanar with said flange and mounted within said casing concentric of said axis, the number of lobes on the outer surface of said rotor being an harmonic of the number of undulations on said outer casing flange surface, said rotor including means concentric of said axis for coupling to external input or output means;

an oscillator carrier comprising a ring member concentric of said axis and mounted within said casing and surrounding said rotor, said ring member including a plurality of equiangularly spaced, radial bores, said ring member including means concentric of said axis for coupling to external input or output means; and an oscillator assembly carried within each bores of said ring member and including a cylindrical spacer slidably received within said bore and disposed intermediate an outer rotatable ball element for riding in contact with said undulating surface of said outer casing flange surface and an inner rotatable ball element for riding in contact with said outer surface of said lobed rotor.

References Cited

UNITED STATES PATENTS

| 1,449,352 | 3/1923 | Seeck | 74—63 |
| 1,592,864 | 7/1926 | Magie et al. | 60—53 |
| 1,743,844 | 1/1930 | Black | 74—63 |
| 2,049,122 | 7/1936 | Kuba | 74—63 |
| 2,285,910 | 6/1942 | De Buigne | 74—63 |
| 3,145,574 | 8/1964 | Morgan | 74—63 |
| 3,283,597 | 11/1966 | Doll | 74—63 |

FOREIGN PATENTS

| 709,203 | 5/1965 | Canada. |
| 369,406 | 3/1939 | Italy. |
| 1,348,564 | 12/1963 | France. |

DONLEY J. STOCKING, Primary Examiner

THOMAS C. PERRY, Assistant Examiner

U.S. Cl. X.R.

74—110, 640; 60—53